US006370180B2

(12) United States Patent
Zenteno

(10) Patent No.: US 6,370,180 B2
(45) Date of Patent: *Apr. 9, 2002

(54) SEMICONDUCTOR-SOLID STATE LASER OPTICAL WAVEGUIDE PUMP

(75) Inventor: Luis A. Zenteno, Painted Post, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,460

(22) Filed: Oct. 25, 1999

Related U.S. Application Data

(60) Provisional application No. 60/115,229, filed on Jan. 8, 1999.

(51) Int. Cl.[7] .............................................. H01S 3/08
(52) U.S. Cl. ....................................................... 372/96
(58) Field of Search ................................ 372/6, 23, 92, 372/102

(56) References Cited

U.S. PATENT DOCUMENTS

| | | | | |
|---|---|---|---|---|
| 3,808,549 A | * | 4/1974 | Maurer | 372/6 |
| 5,309,452 A | | 5/1994 | Ohishi et al. | 372/6 |
| 5,373,576 A | * | 12/1994 | Minns et al. | 385/125 |
| 5,422,897 A | * | 6/1995 | Wyatt et al. | 372/6 |
| 5,473,622 A | | 12/1995 | Grubb | 372/6 |

(List continued on next page.)

FOREIGN PATENT DOCUMENTS

| | | |
|---|---|---|
| EP | 0 656 675 A1 | 10/1994 |
| EP | 0 802 592 A2 | 10/1997 |
| EP | 0 883 218 A1 | 12/1998 |
| WO | WO 95/10869 | 4/1995 |
| WO | WO 97/26688 | 7/1997 |

OTHER PUBLICATIONS

INO, "Rare–Earth–Doped Optical Fibers" —Product Information Sheet, 2/98.
R. Paschotta et al. "Lifetime quenching in Yb–doped fibres" Optics Communications 136 (1977) pp. 375–378.
W. Koechner "Solid–State Laser Engineering" Optical Sciences pp. 47–57.
I. Freitag et al. Quasi–three–level room–temperature Nd:YAG ring laser with high single–frequency output power at 946 nm OP.LETT. Dec. 15, 1995 vol. 20, No. 24 pp. 2499–2501.
I. Freitag et al. "Power scaling of diode–pumped monolithic Nd:YAG lasers to output powers of several watts" Optics Communicattions 115 (1995) pp. 511–515.
Fan et al. "Continuous–wave operation of a room–temperature, diode–laser–pumped, 946–nm Nd:YAG laser" Optics Leters Oct. 1987 vol. 12, No. 10 pp. 809–811.
R. Kock et al. "Efficient room temperature cw Yb:glass laser pumped by a 946 nm Nd:YAG laser" Optics Communications 134 (1997) pp. 175–178.
InnoLight GmbH "Diode–Pumped Nd:YAG Laser @946 nm—Users Manual" 1998.

(List continued on next page.)

Primary Examiner—James W. Davie
Assistant Examiner—Jeffrey N. Zahn
(74) Attorney, Agent, or Firm—Juliana Agon

(57) ABSTRACT

The invention includes a solid state laser which outputs wavelength emission $\lambda_{ss}$ centered about 946 nm, combined with a lasing waveguide which includes a Yb doped optical waveguide such that when the $\lambda_{ss}$ output is inputted into the lasing waveguide the lasing waveguide produces a wavelength emission $\lambda_y$ centered about 980 nm. The invention further includes the utilization of pump light with optical waveguide amplifying devices.

56 Claims, 3 Drawing Sheets

U.S. PATENT DOCUMENTS

| | | | |
|---|---|---|---|
| 5,485,481 A | | 1/1996 | Ventrudo et al. ............... 372/6 |
| 5,511,093 A | | 4/1996 | Edler et al. .................. 375/240 |
| 5,513,913 A | | 5/1996 | Ball et al. .................... 374/120 |
| 5,530,710 A | * | 6/1996 | Grubb ........................... 372/6 |
| 5,561,675 A | | 10/1996 | Bayon et al. ................... 372/6 |
| 5,564,832 A | | 10/1996 | Ball et al. .................... 374/161 |
| 5,589,684 A | | 12/1996 | Ventrudo et al. ........... 250/225 |
| 5,594,747 A | | 1/1997 | Ball ............................. 372/31 |
| 5,650,856 A | | 7/1997 | Morse ........................ 356/436 |
| 5,659,644 A | * | 8/1997 | DiGiovanni ................. 385/31 |
| 5,710,786 A | | 1/1998 | Mackechnie et al. .......... 372/6 |
| 5,805,332 A | * | 9/1998 | Gopinath ................. 359/341.5 |
| 5,905,745 A | * | 5/1999 | Grubb ........................... 372/6 |
| 5,991,314 A | * | 11/1999 | Ionov et al. .................... 372/6 |
| 6,125,222 A | * | 9/2000 | Anthon ........................ 385/33 |

OTHER PUBLICATIONS

D.C. Hanna et al. "An ytterbium–doped monomode fibre laser: broadly tunable operation from 1.010µm to 1.162µm and three–level operation at 974 nm" Journal of Modern Optics, 1990, vol. 37, No. 4, pp. 517–525.

S.G. Grubb et al. "+24.6dBm Output Power Er/Yb Codoped Optical Amplifier Pumped by Diode–Pumped Nd:YLF Laser" Electr.Lett. 28, 13 (1992) pp. 1275–1276.

J. Nilsson et al. "Ring–doped cladding–pumped single–mode three–level fiber laser" OP.Lett. 23, 5 (1998) pp. 355–357.

M. Muendel et al. "35 Watt CW single–mode Yb fiber laser at 1.1µm" CLEO '97 PD paper CPD30–2.

S.G. Grubb et al. "High power sensitized Er–doped fiber amplifier" OFC'91 Technical Digest, Post–deadline paper PD7.

S.G. Grubb et al. "Ultrahigh power diode–pumped 1.5 µm fiber amplifiers" OFC'96 Tech. Digest, paper TuG4, pp. 30–31.

A. White et al. Optical Components and devices:, Optical Fiber Telecommunications IIIB, Chapter 7, pp. 267–318.

P.F. Wysocki et al. "Noise figure limitation in Yb co–doped Er–doped fiber amplifiers pumped at 1064 nm" OFC'96 Tech. Digest, paper TuG6, pp. 32–33.

Jeff Hecht, Understanding Lasers; An Entry Level Guide, IEEE Press, p. 219.*

"High Power Operation of AlGaAs SQW–SCH Broad–Area Laser Diodes for Nd: YAD Solid–State Laser Pumping", Nagai, et al, IEEE Photonics Technology Letters 3 (1991) Feb. No. 2.

* cited by examiner

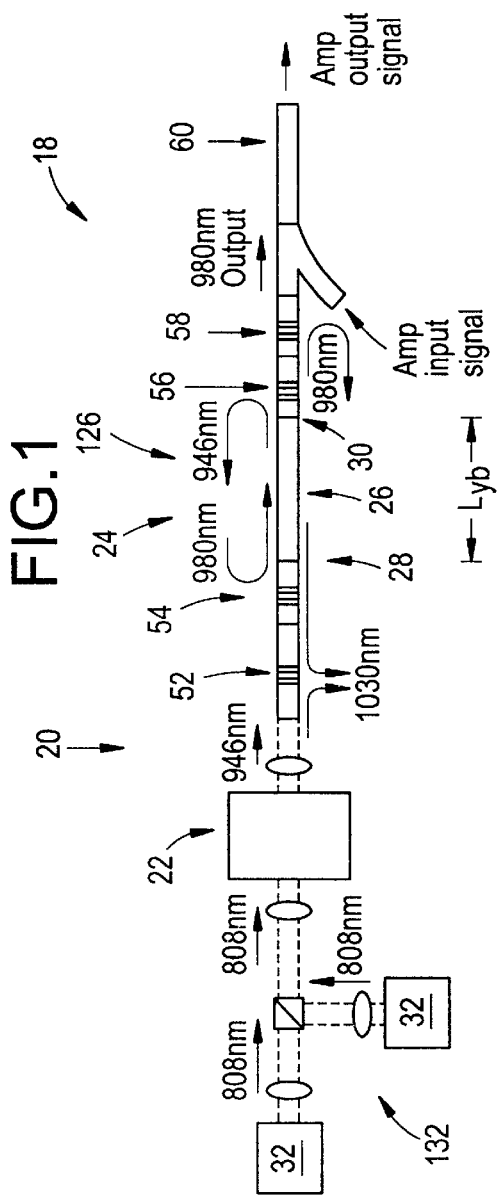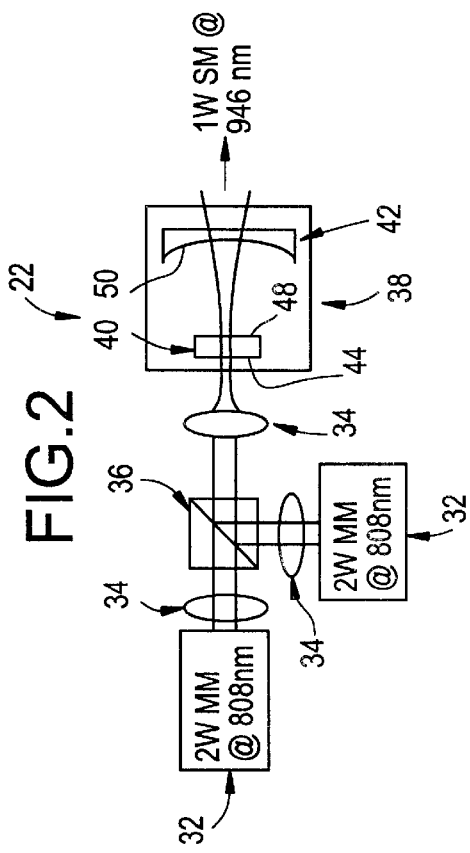

US 6,370,180 B2

SEMICONDUCTOR-SOLID STATE LASER OPTICAL WAVEGUIDE PUMP

CROSS-REFERENCE TO RELATED APPLICATIONS

This application claims priority to U.S. Provisional patent Application Ser. No. 60/115,229, filed on Jan. 8, 1999, the content of which is relied upon and incorporated herein by reference in its entirety.

BACKGROUND OF THE INVENTION

The present invention relates generally to optical waveguide devices, semiconductor lasers, solid state lasers, and particularly to the utilization of lasers to pump optical waveguide amplifiers.

Optical amplifiers and lasers are important components used in optical fiber telecommunications systems. Optical signals transmitted in optical fibers tend to weaken as they travel along the optical fibers. Optical amplifiers provide an economic means of amplifying such weakened optical signals while maintaining the optical nature of the signal.

Erbium doped optical fiber amplifiers have become the dominant means of amplifying optical signals in the 1550 nm optical telecommunications window. Such erbium doped optical fiber amplifiers are normally directly pumped with 980 nm and/or 1480 nm semiconductor pump lasers. With such an amplifier-pump system, electrical energy applied to the 980 nm (1480 nm) semiconductor pump laser produces 980 nm (1480 nm) photons which are coupled through an optical fiber pigtail into the erbium doped optical fiber. The 980 nm and/or 1480 nm pump light excites/energizes the erbium ions in the erbium doped optical fiber so that 1550 nm optical telecommunications signals are amplified by the excited/energized erbium ions. Such direct optical pumping of optical amplifiers with semiconductor produced photons has become the standard in the optical telecommunications industry because of reliability and related use requirements, for example compact space utilization. But, in addition to economic expense problems, such direct semiconductor pump lasers pose problems in terms of already reaching maximum optical output power limitations while the development of optical amplifiers has continued to require higher and higher pump power input requirements. It appears that the commercially available maximum reliable output power of 980 nm semiconductor laser pumps may plateau in the 300 mW output power range while the input pump power requirements of optical amplifiers continue to climb. Semiconductor laser research and development continue to strive towards improving the structure and performance of 980 nm semiconductor laser pumps in an effort to try to meet the needs of optical amplifiers.

The optical amplifier industry needs a pump laser technology that is able to meet its ever increasing optical power demands.

SUMMARY OF THE INVENTION

One aspect of the present invention is an optical waveguide device which includes a solid state laser which outputs wavelength emission $\lambda_{ss}$ centered about 946 nm, combined with a lasing waveguide which includes a Yb doped optical waveguide such that when the $\lambda_{ss}$ output is inputted into the lasing waveguide the lasing waveguide produces a wavelength emission $\lambda_y$ centered about 980 nm.

In another aspect, the present invention includes a method of producing 980 nm optical amplifier pump wavelength light which includes providing a first laser for producing an emission $\lambda_1$, inputting the produced emission $\lambda_1$ into a second laser for producing an emission $\lambda_2$, producing an emission $\lambda_2$, inputting the produced emission $\lambda_2$ into a third laser for producing an emission $\lambda_3$ centered about the 980 nm optical amplifier pump wavelength.

In a further aspect the invention includes an optical amplifier device which includes at least one semiconductor laser which produces an emission $\lambda_1$, centered about 808 nm, a first solid state laser which is optically pumped by the semiconductor laser such that it produces an emission $\lambda_2$ centered about 946 nm, a second solid state laser which is optically pumped by the first solid state laser such that it produces an emission $\lambda_3$ centered about 980 nm, and an optical amplifier waveguide for amplifying an optical transmission signal wherein the optical amplifier is optically pumped by the second solid state laser.

The invention further includes a method of amplifying an optical transmission signal which comprises the steps of: providing a first laser for producing $\lambda_1$ light, a second laser for producing $\lambda_2$ light, and a third laser for producing $\lambda_3$ light, and an optical amplifier which utilizes $\lambda_3$ light to amplify an optical signal; pumping the second laser with $\lambda_1$ light produced by the first laser; pumping the third laser with $\lambda_2$ light produced by the second laser; and pumping the optical amplifier with $\lambda_3$ light produced by the third laser.

Additionally, the invention includes a method of making a 980 nm pump for an optical amplifier, with the method including: providing at least one semiconductor laser diode, coupling the semiconductor laser diode into a Nd:YAG laser, and coupling the Nd:YAG laser into a Yb doped optical waveguide fiber laser.

In a further aspect the invention includes an optical amplifier system comprising a single cladding optical waveguide lasing fiber and a multimode pump source.

The invention further comprises a method of making an optical amplifier pump, which includes providing a multimode pump source; providing a single cladding optical waveguide lasing fiber; and indirectly pumping the lasing fiber with the multimode pump source.

Additionally the invention includes the method of amplifying an optical signal $\lambda_t$, by providing a multimode light pump source having a wavelength $\lambda_{mm}$ multimode brightness output; converting the multimode brightness output into a single mode output having a wavelength $\lambda_{pump}$; and inputting the single mode output into an optical amplifier for amplifying an optical signal $\lambda_t$.

In a further aspect the invention includes an optical amplifier pump for pumping an optical amplifier with a pump wavelength $\lambda_{pump}$, where the pump includes a semiconductor laser which produces a wavelength $\lambda_{semi}$ and the pump outputs at least 500 mW of light at $\lambda_{pump}$.

Additionally the invention includes an optical amplifier pump comprising: a semiconductor laser which produces a wavelength $\lambda_1$ for pumping Nd ions; a plurality of Nd ions, which when pumped by the wavelength $\lambda_1$, produces a wavelength $\lambda_2$ for pumping Yb ions; and a plurality of Yb ions, which when pumped by the wavelength $\lambda_2$ produces a wavelength $\lambda_3$ for pumping Er ions.

In a further aspect the invention includes an optical amplifier pump for pumping an optical amplifier which amplifies optical signals in the range of 1560 to 1620 nm (L-band), which has at least one broad area semiconductor laser; and a neodymium doped solid state laser, with solid state laser pumped by the semiconductor laser.

Additionally the invention includes an optical amplifier that comprises a semiconductor laser; a solid state laser, the solid state laser pumped by the semiconductor laser; and an Er doped optical amplifier fiber, with the Er doped optical amplifier fiber for amplifying signals in the range of 1560 to 1620 nm and pumped by the solid state laser.

In a further aspect the invention includes a method of amplifying a L-band optical signal by providing an Er doped optical fiber, pumping a neodymium solid state laser with a broad area semiconductor laser, inputting said solid state laser directly into the Er doped optical fiber, and amplifying a L-band optical signal with the Er doped optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is a schematic representation in accordance with the present invention.

FIG. 2 is schematic representation in accordance with the present invention.

DETAILED DESCRIPTION OF THE PREFERRED EMBODIMENTS

Figure 3:
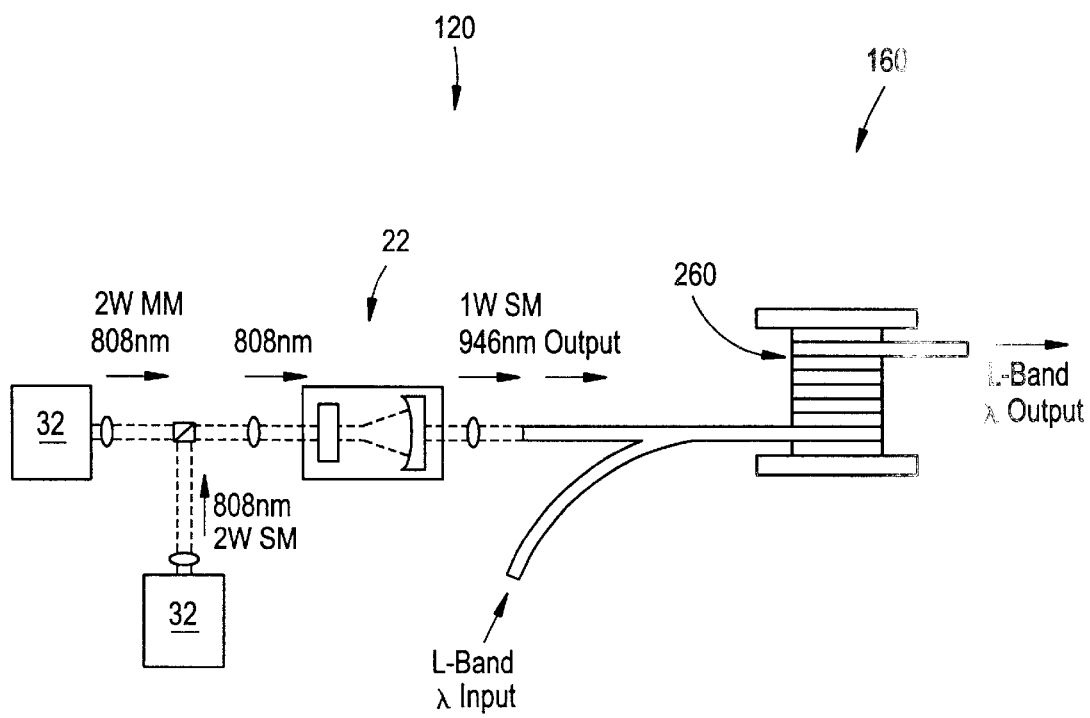
FIG. 3 is schematic representation in accordance with the present invention.

Reference will now be made in detail to the present preferred embodiments of the invention, examples of which are illustrated in the accompanying drawings. An exemplary embodiment of the present invention is shown in FIG. 1. The laser system of the invention is designated generally throughout by reference numeral 20.

In accordance with the invention, the present invention for an optical waveguide device 18 includes a solid state laser 22. Solid state laser 22 outputs a wavelength emission $\lambda_{ss}$ centered about 946 nm. Solid state laser 22 provides a reliable source for producing a high powered laser light output centered about 946 nm. Preferably solid state laser 22 is a neodymium doped solid state laser.

Solid state laser 22 is preferably a neodymium doped solid state laser, such as the Nd:YAG solid state laser shown in FIG. 2, that is pumped by two semiconductor laser diodes 32. Preferred semiconductor lasers for pumping the neodymium doped solid state laser are semiconductor lasers that emit light having a wavelength X with X selected from the Nd absorption bands near 880 nm (from about 860 to about 900 nm), 808 nm (from about 780 to about 830 nm), 740 nm (from about 720 to about 760 nm), and 690 nm (from about 670 to about 710 nm). These Nd absorption wavelength bands are for the Nd solid state YAG host, and with other soild state hosts for Nd the wavelengths and widths of these Nd absorption bands may vary. Preferably laser diodes 32 are broad area lasers with each producing about 2 watts of multimode light (2 W MM) at 808 nm. With optical element lenses 34 and a polarization combiner 36, the output of broad area laser diodes 32 is inputted into Nd:YAG solid state laser 22. Nd:YAG solid state laser 22 is comprised of a 946 nm laser cavity 38 which includes Nd:YAG crystal 40 and glass substrate spherical surface laser element 42. Nd:YAG crystal 40 includes a 946 nm high reflectivity (about 99%) coating 44 and an anti-reflection coating 48 that prevents reflections (946 nm and 1060 nm) other than at 808 nm, coating 48 may include a 808 nm high reflector to provide beneficial reflection of 808 nm light. Spherical surface laser element 42 includes a coating 50 that provides for high reflectivity (about 95%) at 946 nm and high transmission at 1060 nm. Solid state laser 22 preferably produces at least about 1 watt of single mode light at 946 nm. Preferably light in the range of 780 to 880 nm is inputted into solid state laser 22, most preferably 800 to 880 nm. In addition to this external cavity solid state Nd doped crystal embodiment of solid state laser 22, solid state laser 22 may comprise a tapered Nd doped waveguide laser device or a Nd doped double clad optical waveguide fiber laser device.

As shown in FIG. 1, optical waveguide device 18 includes a lasing waveguide 24 that is comprised of a Yb doped optical waveguide 26. Yb doped optical waveguide 26 has an input end 28 and an output end 30. Input end 28 is optically coupled to solid state laser 22 such that the emission $\lambda_{ss}$ outputted from solid state laser 22 is inputted into the lasing Yb doped optical waveguide and an emission $\lambda_y$ centered about 980 nm is outputted from lasing waveguide output end 30.

Yb doped optical waveguide 26 is preferably a silica optical waveguide fiber that is doped with Yb. It is further preferred that the silica optical fiber is an alumino-silicate fiber such as a silica optical fiber doped with Al and Yb. In a most preferred embodiment the Yb doped optical waveguide is Er free, in that the waveguide does not contain erbium so that the Yb ions are the excitable ions in the waveguide. Preferably the Er free Yb doped waveguide is a silica waveguide fiber.

Preferably the Yb doped silica fiber is comprised of 60 to 99 wt. % $SiO_2$. Preferably Yb doped waveguide 26 is a silica fiber which includes 0.1 to 4 wt. % Yb and 0.1 to 10 wt. % Al, and most preferably a waveguide with 0.2 to 2.5 wt. % Yb and 0.2 to 9wt. % Al, with a further preferred Al wt. % of 0.2 to 8.3 wt. % Al. In a preferred embodiment the Yb doped silica fiber composition further comprises Ge (germanium).

It is preferred that lasing waveguide 24 and Yb doped optical waveguide 26 are comprised of single mode optical waveguide fiber with such single mode optical waveguide fiber the guiding of light by the waveguide is restrained to a single mode. Additionally, Yb doped optical waveguide 26 is preferably a single cladding optical fiber, in that the optical fiber has a single clad as compared to a double clad optical fiber or other multi-clad fibers. Preferably Yb doped waveguide 26 consists essentially of a single waveguide cladding and a waveguiding core so that the optical waveguide fiber only has a single waveguide cladding surrounding a waveguide core with appropriate optical fiber protective coatings.

As shown in FIG. 1, optical waveguide device 18 includes a filter 52. Filter 52 is a filter for inhibiting light having a wavelength $\lambda_x$ centered about 1030 nm from propagating in Yb doped optical waveguide 26. Light removal filter 52 removes 1030 nm light so that light produced in the Yb doped waveguide 26 is biased towards the production of 980 nm light. Preferably filter 52 is positioned outside of the 980 nm resonant cavity and most preferably is a fiber grating positioned between solid state laser 22 and Yb doped optical waveguide input end 28. As depicted in FIG. 1, fiber filter 52 is preferably a long period fiber grating that removes unwanted 1030 nm light that may be produced by solid state laser 22. Filter 52 removes and prevents detrimental light having a wavelength centered about 1030 nm from degrading the performance of lasing waveguide 24 and ensures that the beneficial 946 nm excitation light is utilized by Yb ions to produce 980 nm light and to suppress the production of 1030 nm light by Yb ions in Yb doped waveguide 26. In addition to a long period grating, filter 52 can comprise a filter such as a dielectric thin film filter which also removes the unwanted 1030 nm light that is produced by excited Yb ions.

As shown in FIG. 1, lasing waveguide 24 preferably includes at least one fiber Bragg grating. Fiber Bragg gratings provide a beneficial means of reflecting light in an optical fiber waveguide format. Lasing waveguide 24 includes a back reflector 54 proximate Yb doped optical waveguide input end 28. Back reflector 54 is centered about 980 nm and is highly reflective so as to benefit the output of 980 nm light from the lasing waveguide. Lasing waveguide 24 includes a pump reflector 56 proximate Yb doped optical waveguide output end 30. Pump reflector 56 is centered about 946 nm and is highly reflective so that 946 mn pump light that reaches the end of the Yb doped waveguide is contained in the Yb doped waveguide so that it can pump Yb ions into the proper excited state. Lasing waveguide 24 includes an output coupler 58 proximate Yb doped optical waveguide output end 30. Output coupler 58 is centered about 980 nm and is less reflective than back reflector 54 so as to benefit the output of 980 nm light from the lasing waveguide. Output coupler 58 and back reflector 54 are fiber Bragg gratings that provide reflectivity of light to benefit the lasing operation. Pump reflector 56 is also a fiber Bragg grating that provides beneficial reflections. These fiber Bragg gratings can be made in separate optical waveguide fibers which are spliced together with Yb doped optical waveguide fiber 26 to form lasing waveguide 24 or could be one unitary, integral, and complete single optical fiber or spliced variations thereof.

Yb doped optical waveguide 26 has a gain $G_{980}$ at 980 nm and a gain $G_{1030}$ at 1030 nm with $G_{980} > G_{1030}$. Output coupler 58 of lasing waveguide 24 has a reflectivity OCR, and Yb doped waveguide 26 has a Yb weight percent concentration $CONC_{Yb}$, a pump absorption $PA_{946}$ at 946 nm (percent of 946 nm pump power absorbed by the Yb ions) which depends on the 946 nm pump power and the removal of 1030 nm light by 1030 nm light removal filter 52, and a length $L_{Yb}$, wherein gain $G_{980}$ is dependent on $CONC_{yb}$, $PA_{946}$ and OCR and the waveguide length $L_{yb}$ is optimized such that $G_{980} > G_{1030}$ with $G_{980}$ depending on $CONC_{Yb}$, OCR, $PA_{946}$ and $L_{Yb}$. For a given $CONC_{Yb}$, $PA_{946}$ and OCR, the length $L_{Yb}$ is set at an optical length so that $G_{980} > G_{1030}$ and beneficial production of 980 nm light is obtained. In practicing the invention it has been found that for a $CONC_{Yb}$ of about 0.2 wt. % Yb, a $PA_{946}$ greater than 90% (with the long period fiber grating filter removing 1030 nm light), and an OCR reflectivity of about 5% at 980 nm, that the optimized optical fiber length is at about 60 cm. For a given inputted pump power the length is adjusted to insure $G_{980} > G_{1030}$. If light removal long period fiber grating filter 52 is not utilized to remove 1030 nm light and bias the production of 980 nm light by 946 nm pump light, then $PA_{946}$ needs to be kept below 60% so that $G_{980} > G_{1030}$ and to maintain the production of 980 nm which results in wasting 946 nm pump power.

Optical waveguide device 18 of the invention provides at least 300 milliwatts (mW) of 980 nm output which is readily usable for pumping an optical amplifier and meets the high pump power demands of optical amplifiers. Preferably lasing waveguide 24 produces a 980 nm single mode output of at least 0.5 W (a half of a watt). Yd doped optical waveguide output end 30 is optically coupled to an Er doped optical amplifier 60 as depicted in FIG. 1. As such, the invention comprises an optical amplifier pump that produces at least 500 milliwatts of 980 nm pump power and includes a semiconductor laser. Preferably the waveguide device of the invention has a Yb laser slope efficiency of at least 80%. With such, the inventive device provides an optical to optical conversion efficiency greater than 25% (1 W out at 980 nm, 4 W in at 808 nm ), preferably greater than 30%, more preferably greater than 40%, and most preferably greater than 50%.

The invention further includes a method of producing a 980 nm pump light. This method of producing a 980 nm pump light includes the steps of providing a first laser for producing an emission $\lambda_1$ centered about 808 nm; inputting the emission $\lambda_1$ into a second laser for producing an emission $\lambda_2$ centered about 946 nm; producing emission $\lambda_2$, centered about 946 nm; inputting the produced emission $\lambda_2$ into a third laser for producing an emission $\lambda_3$ centered about 980 nm; and then producing emission $\lambda_3$ centered about 980 nm.

The step of providing a first laser for producing $\lambda_1$ and inputting $\lambda_1$ includes providing a semiconductor laser 32 and coupling semiconductor laser 32 into solid state laser 22. The method preferably includes providing a second semiconductor laser 32 for producing the emission $\lambda_1$ centered about 808 nm, and polarization multiplexing or wavelength multiplexing the first laser 32 and the second semiconductor laser 32. Preferably first laser 32 and second semiconductor laser 32 are broad-area laser diodes which produce a multimode emission $\lambda_1$.

Preferably the second laser which provides emission $\lambda_2$ centered about 946 nm is a solid state laser 22, most preferably a Nd doped laser, such as a Nd:YAG laser which comprises a Yd doped solid state lasing waveguide laser, such as a Yb doped laser fiber 26.

Preferably the method of producing a 980 nm pump light includes the step of inhibiting the feedback of 1030 nm light into third laser 24, such as by filtering with filter 52. As shown in FIG. 1, the method further includes inputting the produced emission $\lambda 3$ centered about 980 nm into Er doped optical amplifier 60.

In a further aspect the invention includes an optical amplifier device 18 which includes a semiconductor 32 which produces an emission $\lambda_1$ centered about a first semiconductor wavelength and a first solid state laser 22 which is optically pumped by semiconductor laser 32. First solid state laser 22 produces an emission $\lambda_2$ centered about a first solid state wavelength in the Yb absorption spectrum peak that is centered about 920 nm. The device further includes a second solid state laser 24 that is optically pumped by first solid state laser 22. Second solid state laser 24 produces an emission $\lambda_3$ centered about 980 nm and optical amplifier 60 for amplifying an optical transmission signal is optically pumped by second solid state laser 24. Preferably the first solid state laser 22 is a Nd doped laser and the first solid state wavelength is in the range of 880 to 960 nm. Preferably second solid state laser 24 is comprised of an optical waveguide which includes a Yb doped silica optical waveguide fiber 26. Additionally, second solid state laser 24 preferably includes a fiber Bragg grating back reflector 54 and a fiber Bragg grating pump reflector 56. In a most preferred embodiment of the invention the device includes filter 52 for inhibiting light having a wavelength proximate 1030 nm from entering second solid state laser 24.

The invention further includes a method of amplifying an optical transmission signal, which includes: providing a third laser for producing $\lambda_3$ light; providing an optical amplifier which utilizes $\lambda_3$ light to amplify an optical signal; pumping the second laser with $\lambda_1$ light produced by the first laser, pumping the third laser with $\lambda_2$ light produced by the second laser, and pumping the optical amplifier with the $\lambda_3$ light. Preferably with the method $\lambda_3 > \lambda_2 > \lambda_1$, and most preferably the method includes amplifying an optical transmission signal which has a wavelength $\lambda_t$ such that $\lambda_t > \lambda_3 > \lambda_2 > \lambda_1$. In preferred methods: $\lambda_1$ light is centered about 808 nm; $\lambda_2$ light is centered about 946 nm; and $\lambda_3$ light is centered about 980 nm. The method also further includes suppressing light having a wavelength centered about 1030 nm, such as with a filter 52.

The invention further comprises a method of making a 980 nm pump for an optical amplifier which includes the steps of providing at least one semiconductor laser diode, coupling at least one semiconductor laser diode into a solid state laser, and coupling the solid state laser into a Yb doped optical fiber laser. Preferably the step of providing at least one semiconductor laser diode 32 comprises providing at least two semiconductor laser diodes 32, most preferably providing two broad area semiconductor lasers with each of the semiconductor lasers outputting at least 2 W (two watts) each at a wavelength centered about 808 nm and coupling into a solid state laser includes combining the polarization of the two semiconductor lasers. Preferably the solid state laser 22 comprises a Nd doped solid state laser. Preferably Yb doped optical waveguide fiber laser 24 comprises a single clad single mode alumino-silicate Yb doped fiber 26.

In an additional aspect, the invention includes an optical amplifier system that comprises a single cladding optical waveguide lasing fiber and a multimode pump source. As shown in FIG. 1, the optical amplifier system of the invention comprises single cladding optical waveguide lasing fiber 126 and multimode pump source 132. Preferably single cladding optical waveguide lasing fiber 126 comprises a single mode Yb doped optical 26 and multimode pump source 132 is comprised of a first and second broad area semiconductor laser 32. Most preferably the single cladding optical waveguide lasing fiber is indirectly pumped by said multimode pump source. Additionally, the invention includes a method of making an optical amplifier pump which comprises providing a multimode pump source 132, providing a single cladding optical waveguide lasing fiber 126 and indirectly pumping the lasing fiber 126 with multimode pump source 132.

In a further aspect the invention comprises a method of amplifying an optical signal $\lambda_t$ by providing a multimode light pump source having a wavelength $\lambda_{mm}$ multimode brightness output; converting the multimode brightness output into a single mode output having a wavelength $\lambda_{pump}$; and inputting the single mode output into an optical amplifier for amplifying an optical signal $\lambda_t$. Preferably $\lambda_t > \lambda_{pump} > \lambda_{mm}$.

Additionally, the invention includes an optical amplifier pump for pumping an optical amplifier with a pump wavelength $\lambda_{pump}$, with the pump including a semiconductor laser which produces a wavelength $\lambda_{semi}$ and the pump outputting at least 500 mW of light at $\lambda_{pump}$. Preferably $\lambda_{semi}$ is not equal to $\lambda_{pump}$ ($\lambda_{semi} \neq \lambda_{pump}$) and most preferably $\lambda_{semi}$ is less than $\lambda_{pump}$ ($\lambda_{semi} < \lambda_{pump}$). Preferably $\lambda_{semi}$ is in the range of 780 to 880 nm, and most preferably $\lambda_{semi}$ is at a wavelength which excites neodymium ions. In a preferred embodiment $\lambda_{pump}$ is centered about 946 nm. In a further preferred embodiment $\lambda_{pump}$ is centered about 980 nm.

In a further aspect the invention includes an optical amplifier pump with a semiconductor laser which produces a wavelength $\lambda_1$ for pumping Nd ions, a plurality of Nd ions which when pumped by the wavelength $\lambda_1$ produces a wavelength $\lambda_2$ for pumping Yb ions, and a plurality of Yb ions which when pumped by the wavelength $\lambda_2$ produces a wavelength $\lambda_3$ for pumping Er ions. Preferably $\lambda_1$ is in the range of 780 to 880 nm, $\lambda_2$ is in the range of 900–960 nm, and $\lambda_3$ is in the range of 970–980 nm.

In addition, the invention includes an optical amplifier pump for pumping an optical amplifier which amplifies optical signals in the L-band range of 1560 to 1620 nm which comprises at least one broad area semiconductor laser and a neodymium doped solid state laser with the neodymium doped solid state laser pumped by the semiconductor laser. As shown in FIG. 3, optical amplifier pump 120 comprises using the first part 110 of laser system 20 of FIG. 1 to directly pump L-band optical amplifier 160 with the 946 nm output from Nd doped solid state laser 22. Broad area semiconductor lasers 32 pump solid state laser 22 which inputs the 946 nm light directly into L-Band optical amplifier 160 without utilizing the Yb doped optical fiber. Pump 120 effectively pumps an L-band optical amplifier such as a long length of Er doped Al doped silica amplifier fiber.

The application of the invention to directly pump a L-band optical amplifier includes an optical amplifier 160 which has a semiconductor 32, a solid state laser 22 which is pumped by semiconductor laser 32, and an Er doped optical amplifier fiber 260 for amplifying signals in the range of 1560 to 1620 nm with the amplifier fiber pumped by solid state laser 22. Preferably Er doped optical amplifier fiber 260 is a long length of fiber having a length in the range of 50 to 250 meters, and more preferably 100 to 200 meters. Preferably solid state laser 22 is comprised of neodymium, such as a neodymium doped solid state laser. Preferably semiconductor lasers 32 are broad area multimode semiconductor lasers. The neodymium doped solid state laser may comprise a Nd doped crystal, a Nd doped double clad waveguide, or a Nd doped tapered waveguide. A Nd doped crystal is the preferred solid state laser, with Nd:YAG most preferred.

The invention includes a method of amplifying a L-band optical signal which includes the steps of providing an Er doped optical fiber, pumping a neodymium solid state laser with a broad area semiconductor laser, inputting the solid state laser directly into the Er doped optical fiber, and amplifying a L-band optical signal with the Er doped optical fiber. In a preferred method the provided Er doped fiber has a length of at least 100 meters, and most preferably has a length from 100 to 200 meters. Most preferably the Er doped optical fiber is an Al doped silica fiber.

EXAMPLES

The invention will be further clarified by the following examples which are intended to be exemplary of the invention.

Example 1–2

As shown in FIGS. 1–2, a single-mode Yb:SiO$_2$ fiber laser pumped by a diode-pumped 1.1 W Nd:YAG laser at 946 nm in accordance with the invention provided >650 mW output power at 980 nm and >80% slope efficiency. Such high output power at 980 nm was achieved by pumping at 946 nm using a TEM$_{0,0}$ laser-diode-pumped Nd:YAG. Although the Yb absorption cross section has a minimum near this wavelength, there was still enough absorption to provide the 980 nm output. This inventive pumping scheme obtained 0.65 W of single-mode output from a CS980 brand optical fiber (Corning Incorporated; Corning, N.Y.) output fiber, and is scaleable to much higher output powers and has been found to be useful for pumping Er-doped amplifiers. In this high output power operation of the invention the 1030 nm transition was suppressed.

In practicing the invention as shown in FIG. 1 and described herein, the invention involves the quasi-four-level transition of Nd:YAG at 946 nm to directly pump Yb:SiO$_2$ which lases at 980 nm and directly pumps Er. Such production of 980 nm pump light has provided certain advantages such as compatibility with existing amplifier component technology and pre-amp stage pumping without significant NF degradation as observed with Yb:Er co-doped fibers.

As shown in FIGS. 1–2, the TEM$_{0,0}$ pump laser consisted of a Nd:YAG solid state crystal pumped by a pair of polarization-multiplexed 2 W multimode, broadened-waveguide, broad-area semiconductor laser diodes at 808 nm with emitting aperture of 100×1 $\mu$m$^2$. The solid state laser crystal had a 1 dB absorption length of 3 mm, and dimensions 3×3×8 mm. The plano-concave resonator had a length of 7 mm (optical length is 1 cm). The radius of curvature was about 10 cm and the thermal lens at 4 W pump power was about 15 cm. Thermal lensing caused the resonator spot size to decrease with increasing pump power, and therefore beam divergence increased with pump power. This was verified experimentally, with measured TEM$_{0,0}$ beam divergence in the range 3.4–6 mrad, depending on output power. A schematic of the Nd:YAG laser is shown in FIG. 2. The threshold and slope efficiency of this laser was 1 W of input pump power and 50%, respectively. It had a FWHM of 0.30 nm centered at 945.8 nm. The Nd:YAG solid state crystal laser utilized in the invention was obtained from InnoLight GmbH (Hannover, Germany) and the broad-area semiconductor laser diodes were Polaroid POL-5100BW series brand laser diodes (Polaroid Corporation; Norwood, Ma.). The laser diodes were collimated in the fast axis by a $\mu$-lens element with 100 $\mu$m diameter. This reduced the fast axis NA from 0.6 to about 0.03. An image of the $\mu$-lens aperture was made by a spherical lens element which had a focal length of 1.8 cm. The beams from each laser diode were spatially overlapped in the polarization multiplexer and magnified×1.5 by a lens element, which had a focal length of 2.7 cm. The focused pump spot radius (1/e$^2$) was approximately 80±10 $\mu$m. The measured laser beam spot radius at 100 mW output power was 80–100 $\mu$m, corroborating good pump-signal overlap necessary for efficient quasi-four-level operation.

With a double-pass pump absorption using appropriate coatings in the Nd:YAG laser resonator, about 1.7 W at 946 nm can be achieved with the same 2×2 W laser diode pumps. With 85% coupling of this 1.7 W output into the fiber and an 80% Yb laser slope efficiency, greater than 1.2 W @ 980 nm should be obtained.

The Yb doped fiber laser consisted of a length of Yb-doped fiber with 2 gratings fusion spliced on each side of it as illustrated in FIG. 1. In the input side, pump power was coupled through a X10 aspheric lens element (Newfocus brand lens #5726) into Flexcore 1060 brand optical fiber (Corning Incorporated; Corning, N.Y.) containing a 1030 nm long-period grating (LPG) which was spliced to CS980 brand optical fiber (Corning Incorporated; Corning, N.Y.) containing a Bragg grating back reflector. In the output side, Flexcore 1060 brand optical fiber (Corning Incorporated) containing a Bragg grating pump reflector was spliced to CS980 brand optical fiber (Corning Incorporated) containing a Bragg grating output coupler.

It was found that efficient pump absorption and exclusive three-level laser operation pull the required Yb fiber length in opposite directions; it was found that 946 nm pump absorption should be at most 4–5 dB at threshold, in order to avoid quasi-four-level oscillation in a fiber laser with 14 dB round-trip loss. Since low pump absorption was unacceptable, a spectral filter was used to increase pump absorption. The Yb-doped alumino-silicate fiber with length of 50 cm allowed ≈85% absorption of pump power just below laser threshold; however, besides three-level oscillation between the $^2F_{5/2} \rightarrow {}^2F_{7/2}$ manifolds at 978 nm, unwanted quasi-four-level lasing at 1030 nm and at 1012 nm between two other pairs of strong Stark levels of the same manifolds was simultaneously observed. This was eliminated by the LPG which had a 13 dB notch at 1027 nm; this grating had a loss of 0.15 dB at 946 nm and 1.2 dB at 1012 nm.

The back reflector was a 0.5 nm FWHM FBG centered at 979.8 nm with peak reflectivity >99%. The pump reflector was a 0.6 nm FWHM FBG centered at 945.8 nm with peak reflectivity of >99%; this grating allowed ≈97% pump absorption in a double-pass; for the given fiber length, by taking the pump reflector out about 15% of pump power leaks from the fiber end; it was found that the pump reflector grating also helped to suppress unwanted oscillation at 1012 nm. The output coupler had a 0.5 nm FWHM centered at 979.9 nm with peak reflectivity of 5%; this grating maintained narrow-line oscillation at high pump powers. Without the output coupler, the fiber lased between its cleaved facets at high pump power. The Yb:Sio$_2$ fiber was 0.2 wt. % Yb and 0.2 wt. Al, NA=0.22, cut-off wavelength of 870 nm and peak absorption of 1.77 dB/cm at 980 mn with background loss of 8 dB/km.

Figure 4:
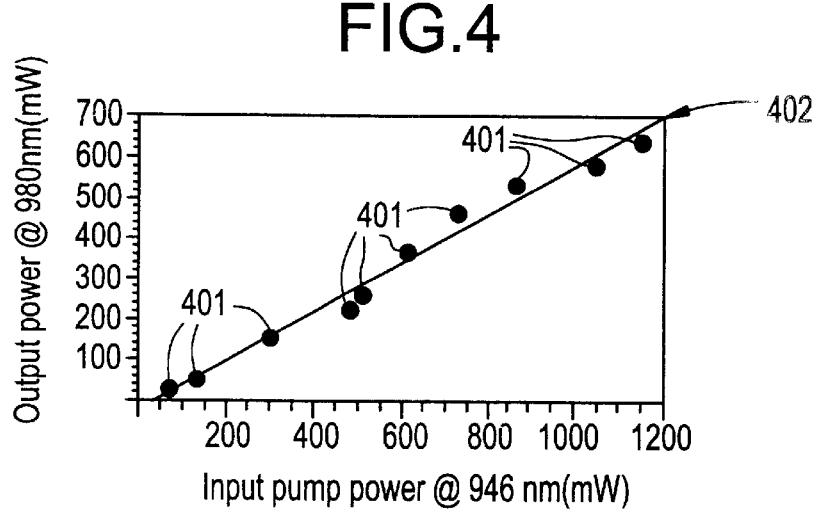
FIG. 4 is a graph of output power (milliwatts) at 980 nm versus input power (milliwatts) at 946 nm.
Figure 5:
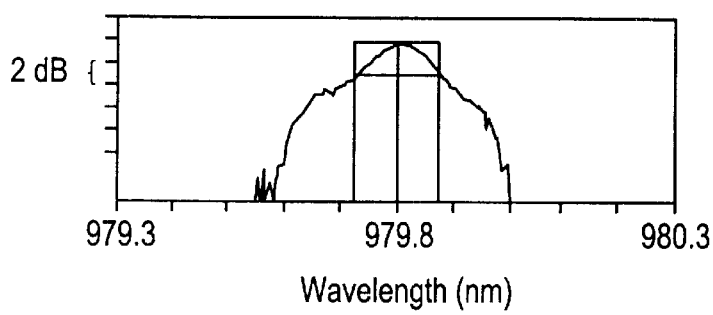
FIG. 5 is an output spectrum plot of light from a Yb fiber laser.

The laser power measured from a cleaved facet of the output CS980 fiber end is shown in FIG. 4 vs. input pump power (measured before the Newfocus brand x10 aspheric lens element); black dots 401 represent result points and solid line 402 is a linear interpolation of these results. Threshold was approximately 41 mW of input pump power and the slope efficiency was 59% with respect to input pump power. Measured losses were as follows: 1.0 dB fiber coupling loss (which corresponds to a coupling efficiency of 88% taking into account the lens 97% transmission and 7% Fresnel reflection from fiber facets), 0.25 dB splicing loss (for a total of 4 splices) and 0.15 dB LPG insertion loss, for a total of about 1.4 dB. After correcting for these losses, the laser slope efficiency is 81% and laser threshold is 30 mW, both with respect to absorbed pump power. The spectrum at 655 mW output power is shown in FIG. 5; it has a FWHM of 0.15 nm centered at 979.8 nm.

A second alumino-silicate Yb-doped fiber was utilized in the invention, having 2.5 wt. % Yb and 8.3 wt. % Al, NA=0.26, cut-off wavelength of 940 nm and peak absorption of 9.75 dB/cm at 980 nm with background loss of 20 dB/km. A 9.5 cm length of this Yb-doped fiber allowed about 85% pump absorption, with measured threshold and slope efficiency of approximately 60 mW and 60%, with respect to absorbed pump power.

These alumino-silicate Yb-doped fibers were prepared by the method by MCVD (modified chemical vapor deposition) process. The results for measured slope efficiency and power threshold are summarized in Table 1. In each case, the Yb fiber length was optimized for lasing at 980 nm with 90% pump absorption, and splice losses were reduced to a minimum. These measurements were obtained with input LPG and back reflector in place, but no gratings in the output end in that the output reflector was the cleaved Yb fiber facet

TABLE 1

| Fiber | Composition (oxide wt. %) | Length for 90% pump absorption (cm) | Pump power threshold (mW) | Slope efficiency |
|---|---|---|---|---|
| Reference | 0.06Yb | 50 | 12 | 0.67 |
| First Example | 0.2Yb/0.2Al | 60 | 28 | 0.79 |
| Second Example | 2.5Yb/8.3Al/0.5Ge | 10 | 56 | 0.57 |

All of these fiber lasers contained two splices: one Flexcore to CS980 splice which consistently had a measured loss of <0.1 dB, and one CS980 to Yb fiber with estimated loss <0.2. The numbers for slope efficiency and threshold were obtained by linear fit to measured input/output points and corrected for pump leakage, pump coupling and Flexcore-CS980 splice loss; they were not corrected for the less reproducible CS980-Yb fiber splice loss; thus, slope efficiency with respect to absorbed pump power may be up to 5% higher in these alumino-silicates.

Figure 6:
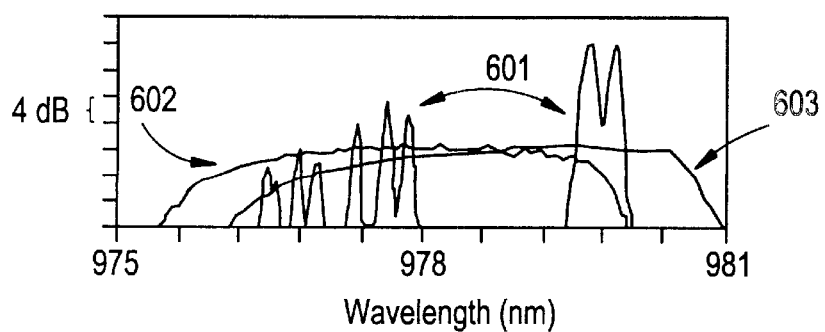
FIG. 6 is an output spectrum plot of light, which shows three output spectrums from Yb fiber lasers.

FIG. 6 shows typical spectra observed without the output gratings (pump reflector and output coupler) for 300 mW of output power. Curve 601 shows how the spectrum breaks with only the LPG and back reflector FBG in place; about 92% of the laser power output is within the FBG bandwidth; weak spurious feedback causes the remaining 8% to be emitted near the peak of the $^2F_{5/2} \rightarrow {}^2F_{7/2}$ transition at 978 nm. For comparison, the free-running spectrum (curve 602) and the spectrum obtained with the FBG replaced by a chirped FBG (curve 603) are also shown; the former has a FWHM of 3.3 nm centered at 978.0 nm, while the latter has a FWHM of 3.2 nm centered at 979.0 nm. The chirped FBG had reflectivity >98% over 25 nm centered at 980.0 nm. Thus the use of proper gratings provided bandwidth control.

Example 3

The Nd doped solid state laser system was utilized to directly pump an Er doped L-Band optical amplifier to provide optical amplification in the 1560 to 1620 range. As shown in FIG. 3, the Nd:YAG solid state laser output of about 1 watt at 946 nm was directly coupled into a L-Band optical amplifier so that approximately 29 dBm of 946 nm light was inputted into a 200 meter length of Er doped optical amplifier fiber. The Er doped optical amplifier fiber was a silica fiber doped with Er and Al. This provided about 22 dBm of amplified output power at 1585 nm with 8.9 dBm of input power at 1585 nm. Er propagation loss of about 20 dBm/km were estimated and the Er absorption at 940 nm was measured to be about 0.2 dB/m.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical waveguide device comprising:
   a first laser for outputting a quasi-four-level emission centered about a quasi-four-level wavelength of 946 nm below a suppressed four-level wavelength centered about 1060 nm, the first laser having a pump beam area and a laser beam area to provide a pump-signal overlap ratio of the pump beam area/the laser beam area of about one which is necessary for efficient quasi-four-level operation; and
   a second laser for outputting a three-level emission centered about a three-level wavelength of 980 nm below a suppressed quasi-four-level wavelength centered about 1030 nm, the second laser having a single cladding,
   the second laser having an input end and an output end, said input end is optically coupled to said first laser such that said quasi-four-level emission outputted from said first laser is inputted as a pump beam into said second laser input end and the three-level emission is outputted from said second laser output end.

2. An optical waveguide device as claimed in claim 1, wherein said first laser comprises a solid state laser.

3. An optical waveguide device as claimed in claim 1, wherein said second laser comprises a Yb doped optical waveguide.

4. An optical waveguide device as claimed in claim 3, wherein said first laser comprises a neodymium doped solid state laser.

5. An optical waveguide device as claimed in claim 4, wherein said Yb doped optical waveguide comprises a single mode optical waveguide fiber for emitting said three-level emission centered about 980 nm.

6. An optical waveguide device as claimed in claim 5, wherein said Yb doped optical waveguide comprises an Er free Yb doped fiber.

7. An optical waveguide device as claimed in claim 5, wherein said Yb doped optical waveguide comprises a silica fiber doped with 0.1 to 4 wt. % Yb and 0.1 to 10 wt. % Al.

8. An optical waveguide device as claimed in claim 5, wherein said Yb doped optical waveguide comprises 60–99 wt. % $SiO_2$.

9. An optical waveguide device as claimed in claim 5, wherein said Yb doped optical waveguide comprises a silica fiber doped 0.2 to 2.5 wt. % Yb and about 0.2 to 8.3 wt. % Al.

10. An optical waveguide device as claimed in claim 4, wherein said neodymium doped solid state laser comprises an external cavity Nd doped crystal.

11. An optical waveguide device as claimed in claim 10, wherein said external cavity Nd doped crystal comprises:
    a Nd doped crystal having at least one anti-reflection coating for suppressing the suppressed four-level wavelength of about 1060 nm:
    a laser output element having an anti-reflection coating for suppressing the suppressed four-level wavelength of about 1060 nm; and
    a laser cavity centered about the quasi-four-level wavelength of about 946 nm formed between the Nd doped crystal and the laser element for outputting the quasi-four-level emission centered about the quasi-four-level wavelength of 946 nm.

12. An optical waveguide device as claimed in claim 5, further comprising:

a pair of reflective gratings disposed about said Yb doped optical waveguide at said input end and said output end for reflecting light at said three-level emission centered about 980 nm; and a filter, said filter for inhibiting light having the suppressed quasi-four-level wavelength centered about 1030 nm from propagating in said Yb doped optical waveguide.

13. An optical waveguide device as claimed in claim 12, wherein said filter is a fiber grating positioned between said solid state laser and said Yb doped optical waveguide input end.

14. An optical waveguide device as claimed in claim 12, wherein said pair of reflective gratings comprise at least one fiber Bragg grating.

15. An optical waveguide device as claimed in claim 12, wherein said pair of reflective gratings comprise a back reflector proximate said Yb doped optical waveguide input end.

16. An optical waveguide device as claimed in claim 12, wherein said pair of reflective gratings comprise a pump reflector proximate said Yb doped optical waveguide output end.

17. An optical waveguide device as claimed in claim 3, wherein said second laser comprises an output coupler proximate said Yb doped optical waveguide output end.

18. An optical waveguide device as claimed in claim 5, wherein said second laser produces a 980 nm single mode output of at least 0.5 W as said three-level emission.

19. An optical waveguide device as claimed in claim 5, wherein said second laser produces a 980 nm single mode output of at least 300 mW as said three-level emission.

20. An optical waveguide device as claimed in claim 3, which has a Yb laser slope efficiency of at least 80%.

21. An optical waveguide device as claimed in claim 3, wherein said Yb doped optical waveguide output end is optically coupled to an Er doped optical amplifier.

22. An optical waveguide device as claimed in claim 1 which has an optical to optical conversion efficiency greater than 25%.

23. An optical waveguide device as claimed in claim 1 which has an optical to optical conversion efficiency greater than 30%.

24. An optical waveguide device as claimed in claim 1 which has an optical to optical conversion efficiency greater than 40%.

25. An optical waveguide device as claimed in claim 1 which has a conversion efficiency greater than 50%.

26. An optical device as claimed in claim 2, wherein light in the range of 780 to 880 nm is inputted into said solid state laser.

27. An optical waveguide device as claimed in claim 12, wherein said Yb doped optical waveguide has a gain $G_{980}$ at 980 nm and a gain $G_{1030}$ at 1030 nm, wherein $G_{980}>G_{1030}$ for suppressing said suppressed quasi-four-level wavelength centered about 1030 nm.

28. An optical waveguide device as claimed in claim 27, said Yb doped optical waveguide having a Yb weight percent concentration $CONC_{Yb}$, a pump absorption $PA_{946}$ at 946 nm, and a length $L_{Yb}$, said lasing waveguide comprising an output coupler having a reflectivity OCR, wherein $G_{980}$ is dependent on $CONC_{Yb}$ and $PA_{946}$ and OCR and $L_{Yb}$ is optimized such that $G_{980}>G_{1030}$.

29. An optical waveguide device as claimed in claim 28, wherein $CONC_{Yb}$ is about 0.2 wt. %, OCR is about 5% at 980 nm, and $L_{Yb}$ is about 60 cm.

30. A method of producing a 980 nm pump light, said method comprising:

providing a first semiconductor laser for producing an emission $\lambda_1$, centered about 808 nm;

producing a quasi-four-level emission $\lambda_2$ centered about 946 nm;

inputting said produced emission $\lambda_1$, centered about 808 nm into a first solid state laser for producing said quasi-four-level emission $\lambda_2$ centered about 946 nm;

producing said quasi-four-level emission $\lambda_2$ centered about 946 nm with the use of said first solid state laser having said quasi-four-level emission $\lambda_2$ centered about 946 nm which is below a suppressed four-level wavelength centered about 1060 nm, wherein the first solid state laser comprises a neodymium doped solid state laser having a pump beam area and a laser beam area such that a pump-signal overlap ratio of the pump beam area/the laser beam area of about unity results which is necessary for efficient quasi-four-level operation;

inputting said produced emission $\lambda_2$ centered about 946 nm into a second solid state laser having a single clad for producing a three-level emission $\lambda_3$ centered about 980 nm; and operating with quasi-four-level efficiency by producing said three-level emission $\lambda_3$ centered about 980 nm which is below a suppressed quasi-four-level wavelength centered about 1030 nm by pumping said second solid state laser with said about unity pump-signal overlap ratio of the pump beam of said first solid state laser.

31. A method as claimed in claim 30, further comprising providing a second semiconductor laser for producing said emission $\lambda_1$, centered about 808 nm.

32. A method as claimed in claim 31, wherein said first semiconductor laser and said second semiconductor laser are broad-area laser diodes and producing said emission $\lambda_1$, centered about 808 nm comprises polarization multiplexing said first semiconductor laser and said second semiconductor laser.

33. A method as claimed in claim 30, wherein said first solid state laser for producing said quasi-four-level emission $\lambda_2$ centered about 946 nm is comprised of a Nd:YAG laser.

34. A method as claimed in claim 30, wherein said second solid state laser for producing said three-level emission $\lambda_3$ centered about 980 nm is comprised of a Yb doped fiber laser.

35. A method as claimed in claim 30, wherein the operating with quasi-four-level efficiency step comprises the steps of:

inhibiting the feedback of 1030 nm light at said suppressed quasi-four-level wavelength into said second solid state laser for producing said three-level emission $\lambda_3$ centered about 980 nm by the use of a light removal filter for suppressing said quasi-four-level 1030 nm light; and reflecting light at wavelengths of about $\lambda_3$ by the use of a pair of reflective gratings disposed about said second solid state laser and after said light removal filter.

36. A method as claimed in claim 30 further comprising:

inputting said produced emission $\lambda_3$ centered about 980 nm into an Er doped optical amplifier.

37. An optical amplifier device comprised of:

a semiconductor laser which produces an emission $\lambda_1$, centered about a first semiconductor wavelength of about 808 nm;

a first solid state laser which is optically pumped by said semiconductor laser, said first solid state laser produces a quasi-four-level emission $\lambda_2$ centered about a first solid state quasi-four-level wavelength of 946 nm below a suppressed four-level wavelength centered about 1060 nm, said first solid state quasi-four-level wavelength in the Yb absorption spectrum peak centered about 920 nm, said first solid state laser comprises a neodymium doped solid state laser having a pump beam area and a laser beam area to provide a pump-signal overlap ratio of the pump beam area/the laser beam area of about one which is necessary for efficient quasi-four-level operation;

a second solid state laser which is optically pumped by said first solid state laser, said second solid state laser having a single clad produces a three-level emission $\lambda_3$ centered about 980 nm which is below a suppressed quasi-four-level wavelength centered about 1030 nm; and an optical amplifier for amplifying an optical transmission signal, said optical amplifier optically pumped by said second solid state laser.

38. An optical amplifier device as claimed in claim 37, wherein said first solid state laser comprises a Nd:YAG laser.

39. An optical amplifier device as claimed in claim 37, wherein said first solid state quasi-four-level wavelength is in the range of 880–960 nm.

40. An optical amplifier device as claimed in claim 37, wherein said second solid state laser is comprised of an optical waveguide.

41. An optical amplifier device as claimed in claim 37, wherein said second solid state laser is comprised of a Yb doped silica optical waveguide fiber.

42. An optical amplifier device as claimed in claim 37 further comprising:

a pair of reflective gratings disposed about said second solid state laser for reflecting light at wavelengths of about 980 nm wherein said pair of reflective gratings is comprised of a fiber Bragg grating back reflector and a fiber Bragg grating pump reflector; and a light removal filter disposed before said pair of reflective gratings for suppressing light at said suppressed quasi-four-level wavelength.

43. An optical amplifier device as claimed in claim 42, wherein said light removal filter inhibits light having the suppressed quasi-four-level wavelength proximate 1030 nm from even entering said second solid state laser.

44. A method of amplifying an optical transmission signal, said method comprising the steps of:

providing a first semiconductor laser for producing $\lambda_1$ light centered about 808 nm;

providing a first solid state laser for producing a quasi-four-level $\lambda_2$ light centered about 946 nm below a suppressed four-level wavelength centered about 1060 nm for operating efficiently at the quasi-four-level by the use of said first solid state laser having a pump beam area and a laser beam area such that a pump-signal overlap ratio of the pump beam area/the laser beam area of about unity results which is necessary for efficient quasi-four-level operation;

providing a second solid state laser having a single clad for producing a three-level $\lambda_3$ light centered about 980 nm below a suppressed quasi-four-level wavelength centered about 1030 nm;

providing an optical amplifier which utilizes $\lambda_3$ light to amplify an optical signal;

pumping said first solid state laser with $\lambda_1$ light produced by said first semiconductor laser;

pumping said second solid state laser with said about unity pump-signal overlap ratio of the pump beam for quasi-four-level efficiently providing said quasi-four-level $\lambda_2$ light produced by said first solid state laser; and pumping said optical amplifier with $\lambda_3$ light produced by said second solid state laser.

45. A method as claimed in claim 44, wherein $\lambda_3 > \lambda_2 > \lambda_1$.

46. A method as claimed in claim 44, wherein the optical transmission signal has a wavelength $\lambda_t$, with $\lambda_t > \lambda_3 > \lambda_2 > \lambda_1$.

47. A method as claimed in claim 44, wherein $\lambda_1$ light is centered about 808 nm.

48. A method as claimed in claim 44, wherein the pumping said first solid state laser step comprises pumping said first solid state laser with $\lambda_1$ light for producing said quasi-four-level $\lambda_2$ light that is centered about 946 nm wherein said $\lambda_1$ light has a wavelength X, wherein X is selected from the group comprising the Nd absorption bands near 880 nm, 808 nm, 740 nm, and 690 nm produced by said first semiconductor laser.

49. A method as claimed in claim 44, wherein the providing the second solid state laser comprises the steps of:

providing said second solid state laser for producing $\lambda_3$ light that is centered about 980 nm which is below said suppressed quasi-four-level wavelength;

suppressing light having wavelengths centered about said suppressed quasi-four-level wavelength by the use of a light removal filter; and reflecting light at wavelengths centered about 980 nm by the use of a pair of reflective gratings disposed about said second solid_state laser and after said light removal filter.

50. A method as claimed in claim 44 further comprising suppressing light having said suppressed quasi-four-level wavelength centered about 1030 nm.

51. A method of making a 980 nm pump for an optical amplifier comprising:

providing at least one semiconductor laser diode;

coupling efficiently for quasi-four-level operation said semiconductor laser diode into a solid state laser having a quasi-four-level emission centered about 946 nm below a suppressed four-level wavelength centered about 1060 nm, wherein said first solid state laser comprises a neodymium doped crystal having a pump beam area and a laser beam area to provide a pump-signal overlap ratio of the pump beam area/the laser beam area of about one which is necessary for efficient quasi-four-level operation; and coupling said solid state laser into a Yb doped optical fiber laser having a single clad for providing a three-level emission centered about 980 nm below a suppressed quasi-four-level wavelength centered about 1030 nm.

52. A method as claimed in claim 51, wherein providing at least one semiconductor laser diode comprises providing at least two semiconductor laser diodes.

53. The method as claimed in claim 52, wherein providing at least two semiconductor laser diodes comprises providing two broad area lasers, with each of said two broad area lasers outputting at least 2 W each at a wavelength centered about 808 nm.

54. The method as claimed in claim 51, wherein said coupling the solid state laser into the Yb doped optical fiber laser step comprises:

coupling said solid state laser into a single clad single mode alumino-silicate fiber as said Yb doped optical fiber laser;

suppressing light at said suppressed quasi-four-level wavelength by the use of a light removal filter; and reflecting light at wavelengths of said three-level emission by the use of a pair of reflective gratings disposed about said Yb doped optical fiber laser and after said light removal filter.

55. An optical amplifier pump comprising:
a semiconductor laser which produces a wavelength $\lambda_1$ for pumping Nd ions wherein $\lambda_1$ is selected from the group comprising ranges near 880 nm, 808 nm, 740 nm, and 690 nm;
a quasi-four-level neodymium doped crystal pumped by said semiconductor laser, said quasi-four-level neodymium doped crystal having a plurality of Nd ions, which when pumped by said wavelength $\lambda_1$, produces a quasi-four-level wavelength $\lambda_2$ centered about 946 nm for pumping Yb ions that is below a suppressed four-level wavelength centered about 1060 nm, said quasi-four-level neodymium doped crystal has a pump beam area and a laser beam area to provide a pump-signal overlap ratio of the pump beam area/the laser beam area of about one which is necessary for efficient quasi-four-level operation;
a three-level single cladding optical waveguide lasing fiber having a plurality of Yb ions, which when efficiently pumped for quasi-four-level operation with said pump-signal overlap ratio of about one by said wavelength $\lambda_2$ produces a three-level wavelength $\lambda_3$ centered about 980 nm for pumping Er ions that is below a suppressed quasi-four-level wavelength centered about 1030 nm.

56. An optical amplifier pump as claimed in claim 55, wherein $\lambda_1$ is in the range of 780–880 nm, $\lambda_2$ is in the range of 900–960 nm, and $\lambda_3$ is in the range of 970–980 nm.

* * * * *